(12) United States Patent
Bottino et al.

(10) Patent No.: US 9,648,449 B2
(45) Date of Patent: May 9, 2017

(54) ELECTRONIC DEVICE AND ELECTRONIC SYSTEM FOR RADIO CONNECTING A PLURALITY OF ELECTRONIC DEVICES

(71) Applicant: C.O.B.O. S.P.A., Leno (Brescia) (IT)

(72) Inventors: Federico Bottino, Invorio (IT); Valerio Cappelli, Varallo Pombia (IT); Stefano Cardani, Mercallo (IT)

(73) Assignee: C.O.B.O. S.P.A, Brescia (IT)

( * ) Notice: Subject to any disclaimer, the term of this patent is extended or adjusted under 35 U.S.C. 154(b) by 0 days.

(21) Appl. No.: 15/055,194

(22) Filed: Feb. 26, 2016

(65) Prior Publication Data

US 2016/0255460 A1    Sep. 1, 2016

(30) Foreign Application Priority Data

Feb. 26, 2015    (EP) ..................................... 15425015

(51) Int. Cl.
*H04W 4/00*    (2009.01)
*H04M 3/02*    (2006.01)
(Continued)

(52) U.S. Cl.
CPC .......... *H04W 4/008* (2013.01); *H04M 1/6075* (2013.01); *H04M 3/02* (2013.01);
(Continued)

(58) Field of Classification Search
CPC ........... H04B 1/385; H04B 2001/3866; H04W 4/008; H04W 4/021; H04W 4/025;
(Continued)

(56) References Cited

U.S. PATENT DOCUMENTS

| 2008/0220718 A1* | 9/2008 | Sakamoto .............. H04B 1/385 455/41.2 |
| 2011/0081861 A1 | 4/2011 | Kuo |
| 2012/0028682 A1 | 2/2012 | Danne |
| 2015/0105020 A1* | 4/2015 | Aida .................. H04M 1/72519 455/41.2 |

OTHER PUBLICATIONS

Garmin, Ltd. Or its Subsidiaries: "zumo 665LM Garmin", Jul. 29, 2014 (Jul. 29, 2014) XP055212456, Retrieved from the Internet: URL:httpL//web/archive.org/web/20140729162058/https://buy.garmin.com/en-US/US/on-the-road/motorcycles/zumo-6651m/prod120318/html [retrieved on Sep. 10, 2015] *p. 1-p. 2*.

(Continued)

*Primary Examiner* — Thanh Le
(74) *Attorney, Agent, or Firm* — Workman Nydegger

(57) ABSTRACT

A routing electronic device comprises a receiver/transmitter configured to: receive a first short-range radio signal carrying data indicating an incoming voice call request and the caller's phone number and transmit a signal carrying a first message indicating the incoming voice call request and the caller's phone number, receive a signal carrying a second message indicating an accepted incoming voice call and transmit the first short-range radio signal carrying data indicating the accepted incoming voice call, receive the first short-range radio signal carrying the audio data of a voice communication, and transmit a second short-range radio signal carrying said audio data of the voice communication. The device further comprises a processing unit configured to: receive the signal carrying the first message and transmit a third message indicating the caller's phone number, receive a fourth message indicating the accepted incoming voice call and transmit the signal carrying the second message.

18 Claims, 6 Drawing Sheets

(51) Int. Cl.
*H04M 3/42* (2006.01)
*H04M 1/60* (2006.01)
(52) U.S. Cl.
CPC ...... *H04M 3/42042* (2013.01); *H04M 1/6058* (2013.01); *H04M 2250/02* (2013.01)
(58) Field of Classification Search
CPC ........... H04W 4/04; H04M 1/05; H04M 3/02; H04M 3/42025; H04M 3/42034; H04M 3/42042; H04M 1/6041; H04M 1/6075; H04M 1/6058; H04M 1/6066; H04M 1/6083; H04M 1/6055; H04M 2250/02; B60R 11/02
See application file for complete search history.

(56) References Cited

OTHER PUBLICATIONS

Garmin zumo 665 owner's manual, Apr. 30, 2010 (Apr. 30, 2010), XP055212410, Retrieved from the Internet: URL: http://ststic.garmincdn.com/puman/zumo665_Ownersmanual.pdf [retrieved on Sep. 10, 2015] *p. 13* *p. 22-p. 23* *p. 28*.
"Zubehör Bluetooth-Kmmunikationssysteme", Jun. 30, 2012 (Jun. 30, 2012, XP055212462, Retrieved from the Internet: URL:http://www.senabluetooth.de/pdf/SMH5TestReis_Motorrad.pdf [retrieved on Sep. 10, 2015] *p. 117*.

* cited by examiner

ND ELECTRONIC
ELECTRONIC DEVICE AND ELECTRONIC SYSTEM FOR RADIO CONNECTING A PLURALITY OF ELECTRONIC DEVICES

BACKGROUND

Technical Field

The present disclosure relates to an electronic device and relating electronic system for radio connecting a plurality of electronic devices, in particular by means of a short-range radio communication network.

Description of the Related Art

Bluetooth technology has been widely disseminated in the market for short-range radio connections thanks to its universal character and user friendliness.

Two devices that use the Bluetooth technology can be connected to each other in just a few seconds, in any part of the world.

It is known to connect a smartphone with headsets without using connecting wires, but using a radio channel, in particular Bluetooth technology: in this way a user wearing the headset can carry on a phone conversation without needing to hold the smartphone in one hand. Therefore, the user has his hands free and can engage in other activities while talking on the phone, such as, for example, driving a car or riding a motorcycle.

Protective helmets for motorcycles which have headsets with Bluetooth technology installed inside the helmet are known. A motorcyclist wearing the helmet can thus connect to a smartphone by means of Bluetooth technology and can carry on a phone conversation while riding the motorcycle.

Bluetooth headsets which have an answer button for switching the headset on or off are also known: in this case it is possible to answer an incoming phone call by pressing the answer button.

The Applicant has observed that one disadvantage of the known techniques is not to allow to make and to receive phone calls with sufficient safety while one is riding a motorcycle or driving a car.

In fact, a motorcyclist who wants to make voice call must take one hand off the motorcycle handlebars, catch the smartphone, select the phone number and activate the voice call by pressing a button on the smartphone keyboard (or touching the screen thereof): these operations require excessive time during which the motorcyclist continues riding the motorcycle with only one hand, thus reducing riding safety.

Analogous considerations can be made for the case wherein the motorcyclist wants to answer an incoming voice call, because the motorcyclist must take one hand off the motorcycle handlebars and press a button on the smartphone keyboard (or touch the screen thereof) to answer the incoming voice call.

If the Bluetooth headsets with an answer button are installed inside the protective helmet, the motorcyclist must take one hand off the handlebars and press the answer button to answer the incoming voice call; therefore, in this case as well there is a time interval wherein the motorcyclist continues riding the motorcycle with only one hand, thus reducing riding safety.

The previous observations regarding insufficient safety while riding are applicable in an analogous manner to driving a car.

BRIEF SUMMARY

According to a first aspect, the present disclosure relates to an electronic device for routing short-range radio signals as defined in the enclosed claim 1 and by its preferred embodiments disclosed in the dependent claims 2 to 6.

The Applicant has perceived that the electronic device in accordance with the first aspect has the advantage of improving safety while driving a car or riding a motorcycle, because it allows to make and receive voice calls without taking a hand off the steering wheel of the car or the handlebars of the motorcycle.

Moreover the electronic device according to the first aspect has the advantage of being able to be easily installed in motorcycles or cars, even after the manufacture thereof, since it uses radio connections and thus reduces the number of fixed connections present inside the electronic system that comprises the electronic device.

According to a second aspect, the present disclosure relates to an electronic system for the short-range radio connection of a plurality of electronic devices as defined in the enclosed claim 7 and by its preferred embodiments disclosed in the dependent claims 8 to 10.

According to a third aspect, the present disclosure relates to a motorcycle as defined in the enclosed claim 11.

According to a fourth aspect, the present disclosure relates to a method for short-range radio connecting a plurality of electronic devices as defined in the enclosed claim 12 and by its the preferred embodiments disclosed in the dependent claims 13 to 16.

DETAILED DESCRIPTION

It should be observed that in the following description identical or analogous blocks, components or modules are indicated in the figures with the same numerical references.

Figure 1:
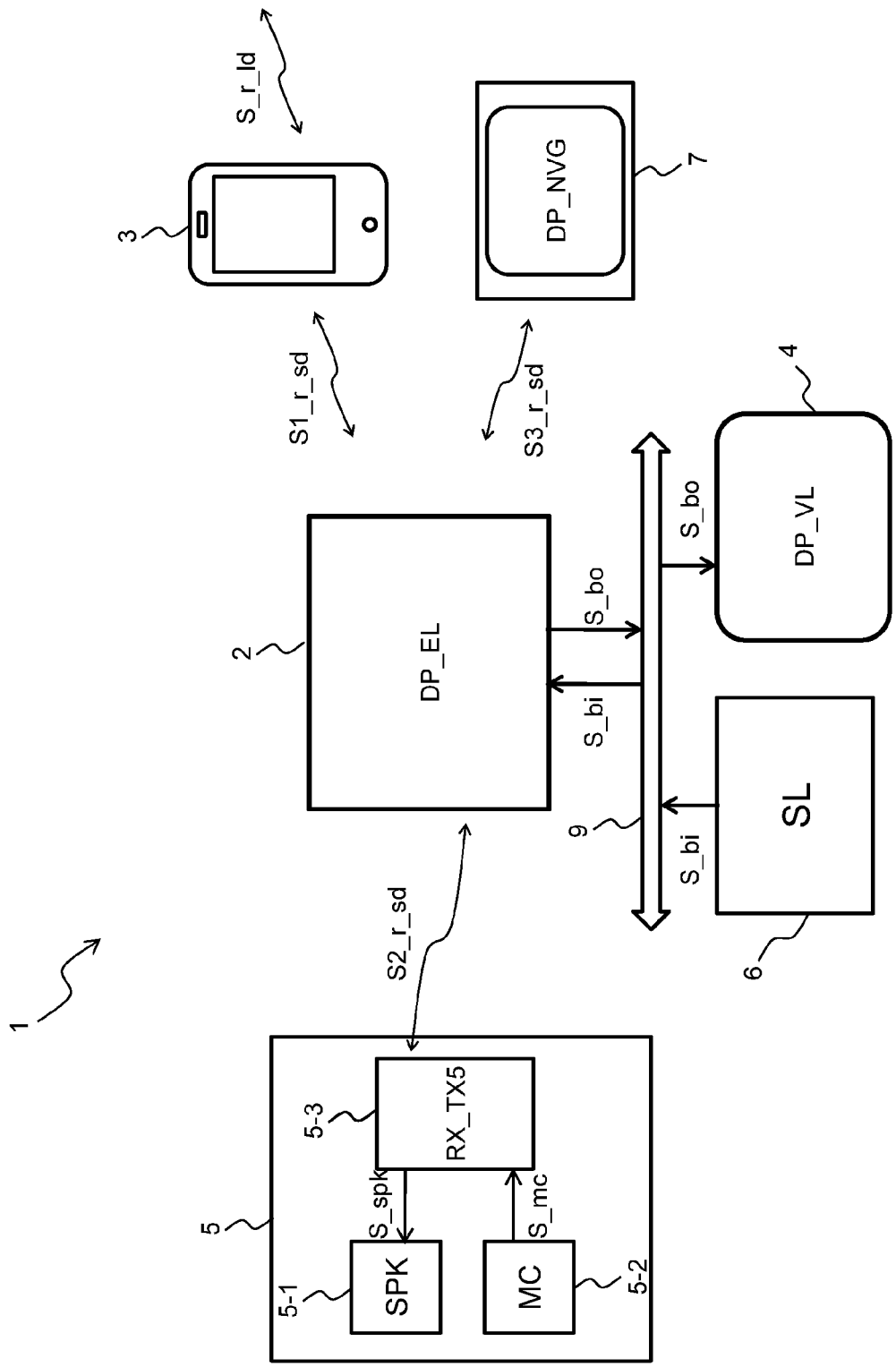
FIG. 1 schematically shows an electronic system for radio connection of a plurality of electronic devices according to the disclosure.

With reference to FIG. 1, it shows an electronic system 1 for short-range radio connection of a plurality of electronic devices according to the disclosure, by means of a short-range radio communication network.

The term "short-range" means a distance of less than 15 metres.

The technology used to make the radio connection can be for example Bluetooth or WiFi (standard IEEE 802.11).

The electronic system 1 is installed for example on a motorcycle or on a car.

In the case of a motorcycle, the electronic system 1 is installed partly on the motorcycle and partly in the protective helmet worn by the motorcyclist.

In the case of a car, the electronic system 1 is installed at least partly inside the car cabin.

The electronic system 1 comprises:
- a mobile electronic device 3;
- an audio player device 5;
- a routing electronic device 2;
- an image display device 4;
- a communication bus 9.

The electronic system 1 further comprises a selector 6 configured to select from among the following functions:
- activating a procedure for making an outgoing voice call by typing in a phone number, or by selecting a phone number from a telephone book or by selecting a phone number from a list of the last calls made/answered/missed;
- activating a procedure for accepting to answer to an incoming voice call;
- activating a procedure for refusing to answer to an incoming voice call;
- activating a procedure for ending an active voice call;
- scrolling through a list of names and/or phone numbers in a telephone book;
- activating the reading of a short text message;
- activating the writing of a short text message;
- playing a music track;
- selecting a music track from a list and playing it;
- stopping the playing of a music track.

Alternatively, the selector 6 is configured to activate one of the following operating modes:
- a first operating mode indicating a "voice call";
- a second operating mode indicating "playing of a music track";
- a third operating mode indicating "short text messages".

In the event that the first operating mode indicating a voice call is activated, the selector 6 is further configured to select one of the following functions:
- activating a procedure for making an outgoing voice call by typing in a phone number, or by selecting a phone number from a telephone book or by selecting a phone number from a list of the last calls made/answered/missed;
- activating a procedure for accepting to answer to an incoming voice call;
- activating a procedure for refusing to answer to an incoming voice call;
- activating a procedure for ending an active voice call;
- scrolling through a list of names and/or phone numbers in a telephone book.

In the event that the second operating mode indicating the playing of a music track is activated, the selector 6 is further configured to select one of the following functions:
- playing a music track;
- selecting a music track from a list and playing it;
- stopping the playing of a music track.

In the event that the third operating mode indicating short text messages is activated, the selector 6 is further configured to select one of the following functions:
- activating the reading of a short text message;
- activating the writing of a short text message.

In the case of a motorcycle, the selector 6 is mounted on the motorcycle handlebar in proximity to a handle: in this way the motorcyclist can select one of the above indicated functions without removing the hands from the handlebar while riding.

In the case of a car, the selector 6 is mounted near the vehicle steering wheel: in this way the driver can select one of the above indicated functions without removing the hands from the steering wheel while driving.

The selector 6 is connected to the routing electronic device 2 by means of the communication bus 9 carrying a bus input signal S_bi.

Alternatively, the selector 6 is not connected to the communication bus 9, but is directly connected to the image display device 4, which thus allows to connect the selector 6 with the routing electronic device 2.

Figure 6:
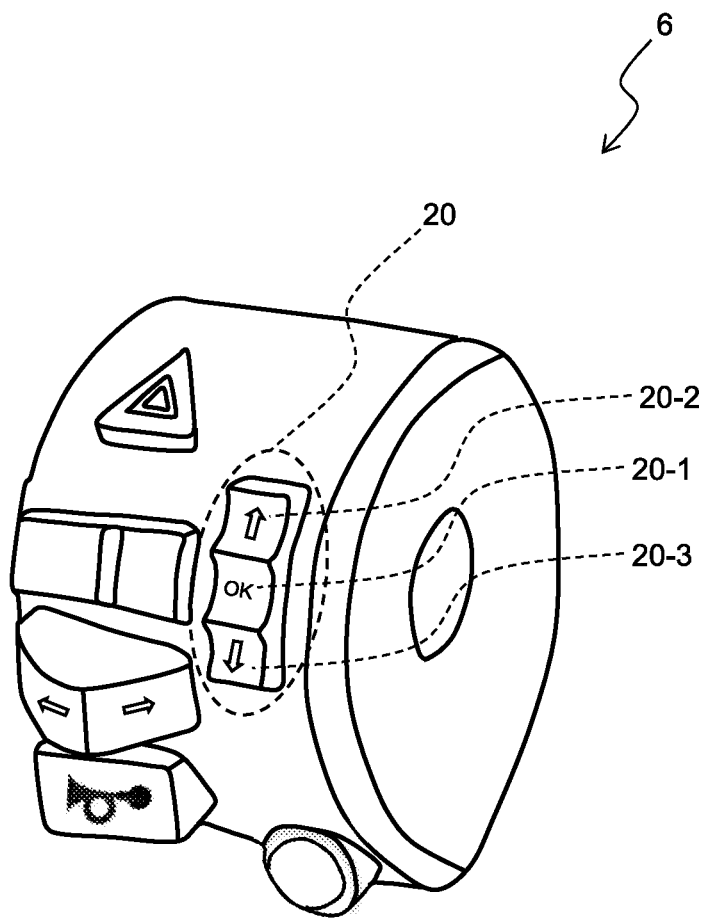
FIG. 6 shows a perspective view of a selector made with a switch cube used in the electronic system according to the disclosure.

Advantageously, the selector 6 is a switch cube mounted on the handlebar of a motorcycle and comprises a switch 20 having a plurality of different positions, as shown in FIG. 6.

In particular, the selector 6 is made with a switch cube comprising a switch 20 (encircled by a dashed line) having three buttons 20-1, 20-2, 20-3 associated with three respective positions, wherein "ok" is indicated on button 20-1, an up direction arrow is indicated on button 20-2 and a down direction arrow is indicated on button 20-3.

Advantageously, one of the buttons (for example button 20-1) is configured to select one of the operating modes (voice call, music track, short text messages, navigation).

In this case the function selected by a button of the switch depends on the selected operating mode, that is, the same button will activate different functions: in this manner the number of used buttons is reduced.

For example:
- in the case of an incoming voice call, pressing the button 20-1 of the switch 20 allows to answer the voice call;
- if the music playing function is active, pressing the same button 20-1 allows to start or stop playing a track;
- if navigation toward a destination is active, pressing the same button 20-1 allows to stop the navigation.

Another example is the following:
- in case of an outgoing voice call, pressing the buttons 20-2, 20-3 allows to scroll through a list of names (or phone numbers) included into a telephone book;
- in case of playing music, pressing the buttons 20-2, 20-3 allows to scroll through a list of music track titles.

Advantageously, a same button is configured to select two or more functions.

In particular, the first function is selected by briefly pressing the button, whereas the second function is activated by pressing the same button longer (for example, for at least 3 seconds).

For example:
- in case of an incoming voice call, briefly pressing the button 20-1 allows to answer the incoming voice call, whereas pressing the same button 20-1 longer allows to reject the incoming voice call;
- if navigation towards a destination is active, briefly pressing the button 20-1 allows to stop navigating, whereas pressing the same button 20-1 longer allows to view information relating to the present destination on the image display device 4 (for example, the remaining time or distance to the destination, or the list of directions to get to the destination).

The selector 6 implemented with a switch cube can comprise two (or more) switches, each having a plurality of different positions.

For example, the switch cube comprises two switches implemented like the switch 20 shown in FIG. 6, wherein each switch comprises three buttons.

The mobile electronic device 3 comprises:
- a long-range radio signal receiver-transmitter configured to receive/transmit from/to a radio-mobile network a long-range radio signal S_r_ld carrying audio data of a voice call;

a short-range radio signal receiver/transmitter configured to receive/transmit from/to the routing electronic device 2 a first short-range radio signal S1_r_sd carrying audio data of the voice communication or audio data of a music track.

The long-range radio signals are for example of the GSM, UMTS or 4G type.

The short-range radio signals are for example of the Bluetooth or WiFi type.

In one embodiment, the mobile electronic device 3 comprises a memory configured to store a telephone book comprising names and/or phone numbers.

In one embodiment, said memory is further configured to store audio data representative of music tracks and/or video streams.

The mobile electronic device 3 can be a smartphone (for example, a BlackBerry or an iPhone) capable of establishing a two-way communication so as to make a voice call to a radio-mobile network and to receive a voice call from the radio-mobile network; moreover, the smartphone is capable of accepting or rejecting an incoming voice call and of ending the active voice call.

In one embodiment, the smartphone is configured to support the writing and reading of short text messages.

In one embodiment, the smartphone is configured to allow to scroll through a list of names and/or phone numbers of a telephone book.

In one embodiment, the smartphone is configured to allow the selection of a music track from a list and to play and stop playing the music track.

The mobile electronic device 3 can also be a tablet (for example, an iPad) or a laptop.

The audio player device 5 is an electronic device which comprises:
one or more speakers 5-1 generating a sound signal representative of a voice of a phone conversation or the music of a music track;
a receiver/transmitter 5-3 of short-range radio signals, for example of the Bluetooth or WiFi type.

The audio player device 5 is such as to exchange radio signals with the smartphone 3 by means of the routing electronic device 2, as will be explained more in detail below.

The audio player device 5 is for example a headset or headphones.

In the case of a headset, it is for example installed inside a protective motorcycle helmet (i.e. the speaker 5-1 and the short-range radio receiver/transmitter 5-3 are positioned inside the protective helmet) and allows to play the voice of a phone conversation or to play a music track.

Alternatively, the audio player device 5 is installed inside a car cabin, wherein the speaker 5-1 is composed of a plurality of speakers (for example, two, four or six) positioned in the cab in proximity to the front and back seats.

In one embodiment, the audio player device 5 comprises a microphone 5-2 which allows to acquire the voice of a motorcyclist or of a car driver during a phone conversation: therefore in this case the audio device 5 is an audio player/acquisition device.

In this case the audio player/acquisition device 5 is for example a headset (also indicated as "intercom") installed inside a protective motorcycle helmet (i.e. the speaker 5-1, the microphone 5-2 and the short-range radio receiver/transmitter 5-3 are positioned inside the protective helmet) and allows both to reproduce the voice of a phone conversation or to play the music track and to acquire the voice of the phone conversation.

In the case of a car, the audio player/acquisition device 5 is installed inside the car cabin, wherein:
the microphone 5-2 is installed on the ceiling of the car in proximity to the driver's seat (for example, on the ceiling at the position of separation between the driver's seat and passenger seat);
the speaker 5-1 is composed of a plurality of speakers (for example, two, four or six) positioned in the cabin in proximity to the front and back seats;
the short-range radio receiver/transmitter 5-3 is installed inside the car cabin.

Alternatively, in the case of a car the audio player/acquisition device 5 is implemented inside a container which can be positioned inside the car cabin, in proximity to the dashboard (for example, it can be rested upon a flat surface or it can be fixed with screws).

The short-range radio receiver/transmitter 5-3 is configured to receive a second short-range radio signal S2_r_sd carrying audio data representative of a phone conversation or music track.

Moreover, the short-range radio receiver/transmitter 5-3 is configured to generate, as a function of the values of the second short-range radio signal S2_r_sd, a driving signal S_spk (for example, a voltage signal) to drive the speaker 5-1 so that it generates a sound signal reproducing said audio data.

Moreover, the short-range radio receiver/transmitter 5-3 is configured to receive a voice signal S_mc (for example, a voltage signal) representive of the voice acquired by means of the microphone 5-2 and to generate, as a function of the values of the voice signal S_mc, the second short-range radio signal S2_r_sd carrying audio data representative of the acquired voice.

The routing electronic device 2 has the function to allow to connect each other the mobile electronic device 3 and the audio player device 5 by means of a short-range radio communication channel (for example of the Bluetooth or WiFi type), in order to implement the above indicated functions.

In particular:
if the function is to make an outgoing voice call or to receive an incoming one, the routing electronic device 2 is configured to set up a radio communication between the short-range radio receiver-transmitter 5-3 of the audio player device 5 and the receiver-transmitter of the smartphone 3 in such a way as to allow to make said voice call;
if the function is to read or to write a short text message, the routing electronic device 2 is configured to set up a radio communication between the short-range radio receiver/transmitter 5-3 of the audio player device 5 and the receiver/transmitter of the smartphone 3 in such a way as to allow the reception or the transmission of the short text message;
if the function is to select and play a music track, the routing electronic device 2 is configured to set up a radio communication between the short-range radio receiver/transmitter 5-3 of the audio player device 5 and the receiver/transmitter of the smartphone 3 in such a way as to allow said selection and play of the music track;
if the function is to stop playing a music track, the routing electronic device 2 is configured to set up a radio communication between the short-range radio receiver/transmitter 5-3 of the audio player device 5 and the receiver/transmitter of the smartphone 3 in such a way as to allow to stop to play the music track currently played.

The communication bus 9 has the function of connecting the routing electronic device 2 with the selector 6 and with the image display device 4, by means of the bus input signal S_bi and the bus output signal S_bo.

The communication bus 9 is for example of the CAN (Controller Area Network) type.

The image display device 4 is configured to display information in text form and/or images representive of the activated function.

The image display device 4 is for example an LCD or LED screen.

In particular:
- if the function is to make an outgoing voice call, the image display device 4 is configured to display the name and/or phone number called and to display a list of the names and/or phone numbers stored into the phonebook of the smartphone 3;
- if the function is to answer an incoming voice call, the image display device 4 is configured to display the caller's name and/or phone number;
- if the function is to activate the reading of a short text message, the image display device 4 is configured to display the content of the short text message;
- if the function is to activate the writing of a short text message, the image display device 4 is configured to display the content of the short text message while it is being written;
- if the function is to select a music track and play it, the image display device 4 is configured to display the title (and optionally the artist) of the selected track and display a list of the tracks stored inside a memory of the smartphone 3;
- if the function is to stop playing a music track, the image display device 4 is configured to display an icon indicating that the music track that was playing has been stopped.

The image display device 4 is mounted in the dashboard of the motorcycle or of the car, in such a way that it is easily visible to the motorcyclist or to the car driver.

The image display device 4 is connected to the routing electronic device 2 by means of the communication bus 9, which carries the bus output signal S_bo.

The group composed of the selector 6 mounted on the handlebars of a motorcycle or on the steering wheel of a car and of the image display device 4 mounted in the dashboard of the motorcycle or of the car allow to improve driving safety, because they allow to the motorcyclist or car driver to activate one of the above indicated functions, without removing the hands from the handlebar or from the steering wheel and without diverting the gaze too long from the road.

Figure 2:
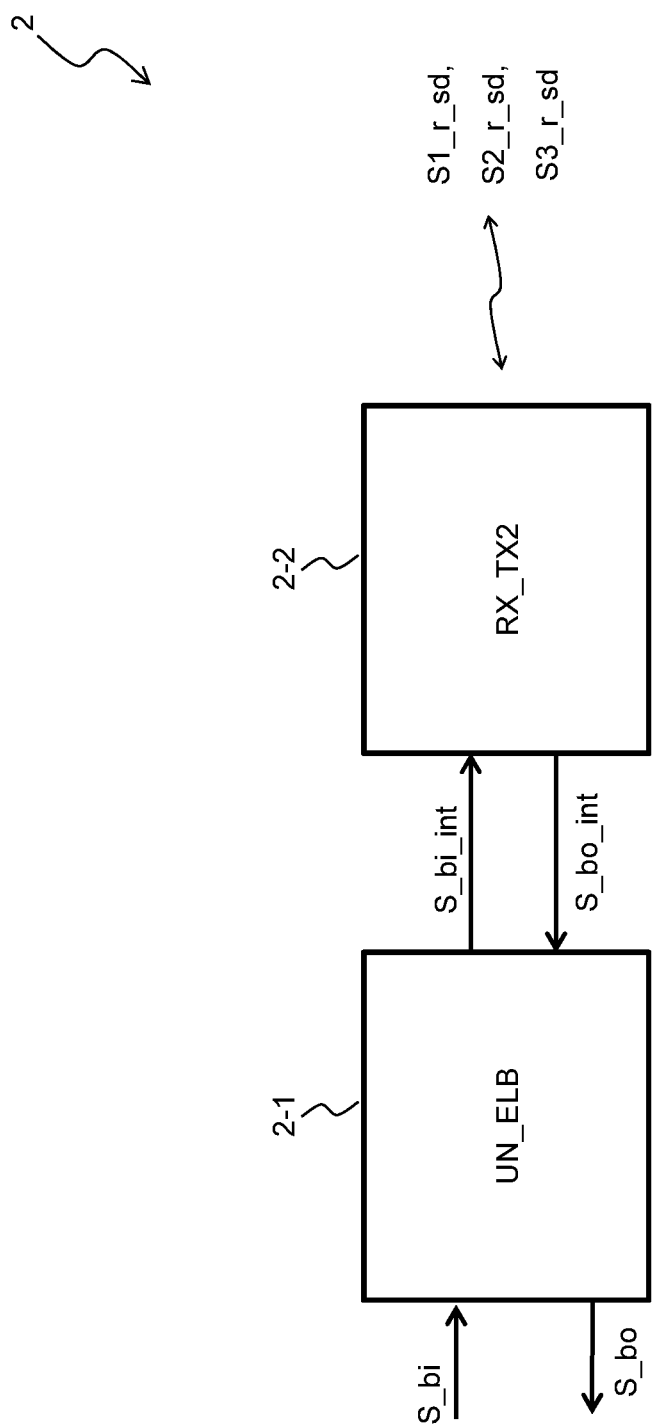
FIG. 2 shows a block diagram of a routing electronic device inside the electronic system according to the disclosure.

With reference to FIG. 2, it shows more in detail a block diagram of the routing electronic device 2.

The routing electronic device 2 comprises a processing unit 2-1 and a short-range radio signal receiver/transmitter 2-2, for example of the Bluetooth or WiFi type.

The processing unit 2-1 is bidirectionally connected to the short-range radio receiver-transmitter 2-2.

The processing unit 2-1 is for example a microprocessor or a programmable logic device (for example, a FPGA=Field Programmable Gate Array).

In particular, the routing electronic device 2 comprises an input terminal adapted to receive the bus input signal S_bi from the communication bus 9 and comprises an output terminal adapted to transmit the bus output signal S_bo over the communication bus 9.

The short-range radio receiver/transmitter 2-2 is configured to receive/transmit from/to the audio player device 5 the second short-range radio signal S2_r_sd carrying audio data and is configured to receive/transmit from/to the mobile electronic device 3 the first short-range radio signal S1_r_sd carrying audio data.

Figure 3:
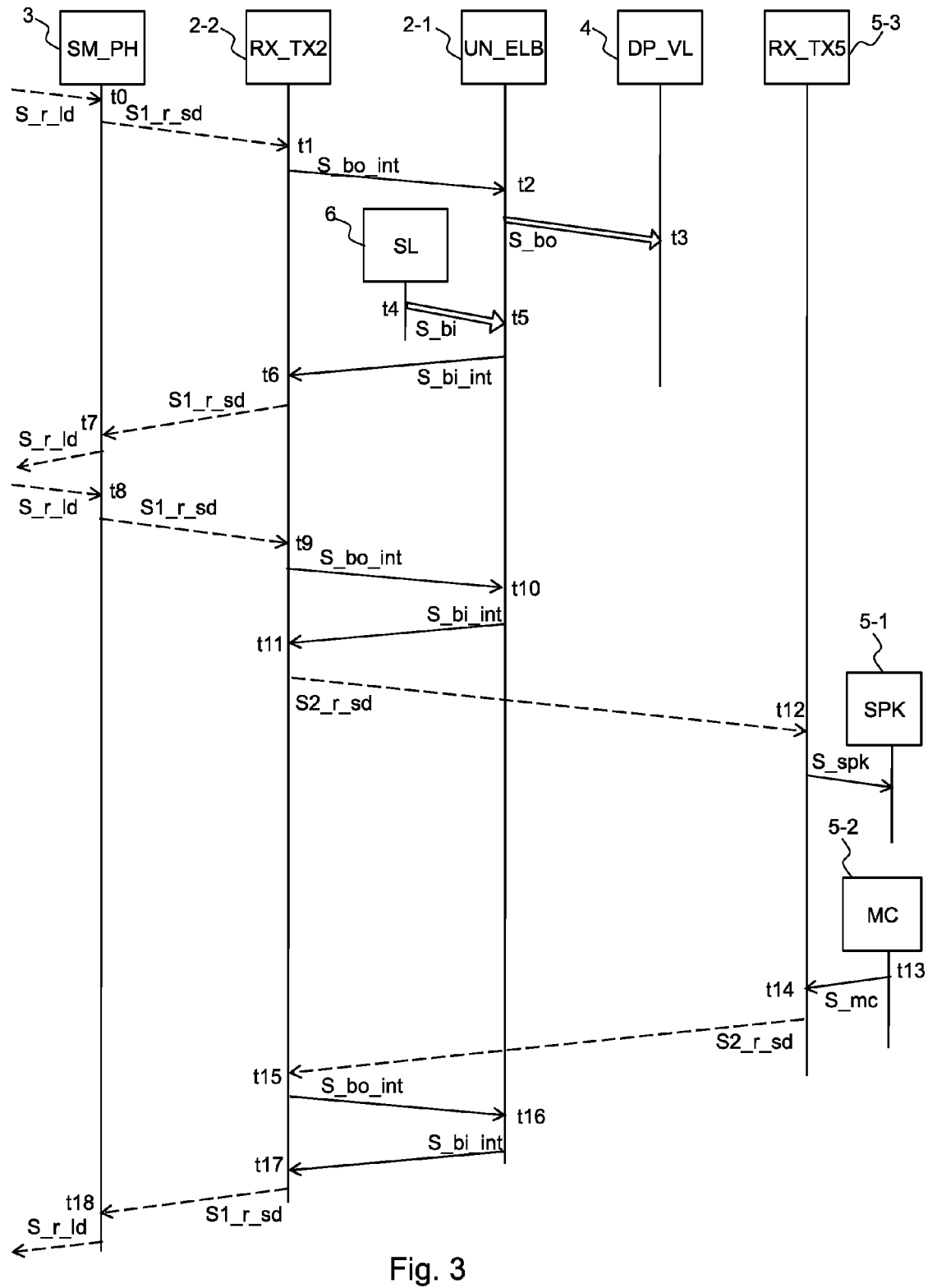
FIG. 3 schematically shows a communication protocol between the electronic devices according to the disclosure in the case of an incoming voice call.

With reference to FIG. 3, it shows the timing sequence of the signals and messages of the communication protocol between the devices of the electronic system 1, in the event that a motorcyclist riding a vehicle activates the procedure for accepting an incoming voice call of a phone conversation via a radio-mobile network between the motorcyclist and another person equipped with a smartphone.

For the sake of simplicity we shall consider a motorcycling application, in which the electronic system 1 is mounted on a motorcycle, the mobile electronic device 3 is a smartphone, the electronic device audio 5 is a headset installed inside a protective helmet worn by the motorcyclist and the selector 6 is mounted on the motorcycle handlebar.

It is possible to observe that there is a voice call configuration phase comprised between times t0 and t7.

Moreover, it is possible to observe that there is a subsequent phase wherein the phone conversation is actually carried out comprised between t8 and t18, wherein the audio data of the phone conversation are transmitted by the smartphone 3 to the speaker 5-1 by means of the routing electronic device 2 and the audio data of the phone conversation are transmitted by the microphone 5-2 to the smartphone 3 by means of the routing electronic device 2.

Moreover, it is possible to observe that short-range radio signals (indicated with dashed lines) are exchanged between:
- the smartphone 3 and the short-range radio receiver/transmitter 2-2 of the routing electronic device 2, by means of the first short-range radio signal S1_r_sd;
- the short-range radio receiver/transmitter 5-3 of the audio player device 5 and the short-range radio receiver/transmitter 2-2 of the routing electronic device 2, by means of the second short-range radio signal S2_r_sd.

Moreover, it is possible to observe that messages are exchanged by means of fixed connections (electric wires, transmission lines or buses, indicated with continuous lines) between:
- the routing electronic device 2 and the selector 6, by means of the communication bus 9;
- the routing electronic device 2 and the image display device 4, by means of the communication bus 9;
- the processing unit 2-1 and the short-range radio receiver/transmitter 2-2, by means of the internal input signal S_bi_int and of the internal output signal S_bo_int.

Moreover, it is possible to observe in FIG. 3 that there is always an exchange of information between the short-range radio receiver-transmitter 2-2 and the processing unit 2-1, as shown between times t9 and t11 and between times t15 and t17.

In other words, the short-range radio receiver-transmitter 2-2 receives the data via radio and forwards them to the processing unit 2-1 (arrow between times t9 and t10), i.e. it does not transmit the data via radio after receiving them via radio, but it transmits the data via radio after receiving them from the processing unit 2-1 (arrow between t10 and t11).

This has the advantage to allow to connect the mobile electronic device 3 to the audio player device 5 using only one short-range radio receiver/transmitter 2-2.

Moreover, it has the further advantage of improving flexibility, because it allows to implement several functionalities at software level rather than at hardware level, wherein said software is run on the processing unit 2-1.

For example, in the event that short-range radio signal is of the Bluetooth type, the short-range radio receiver/transmitter 2-2 is configured to execute at hardware level the lower controller layer ("controller stack") of the Bluetooth stack, whereas the processing unit 2-1 is configured to execute at software level the upper host layer ("host stack") of the Bluetooth stack.

Figure 4:
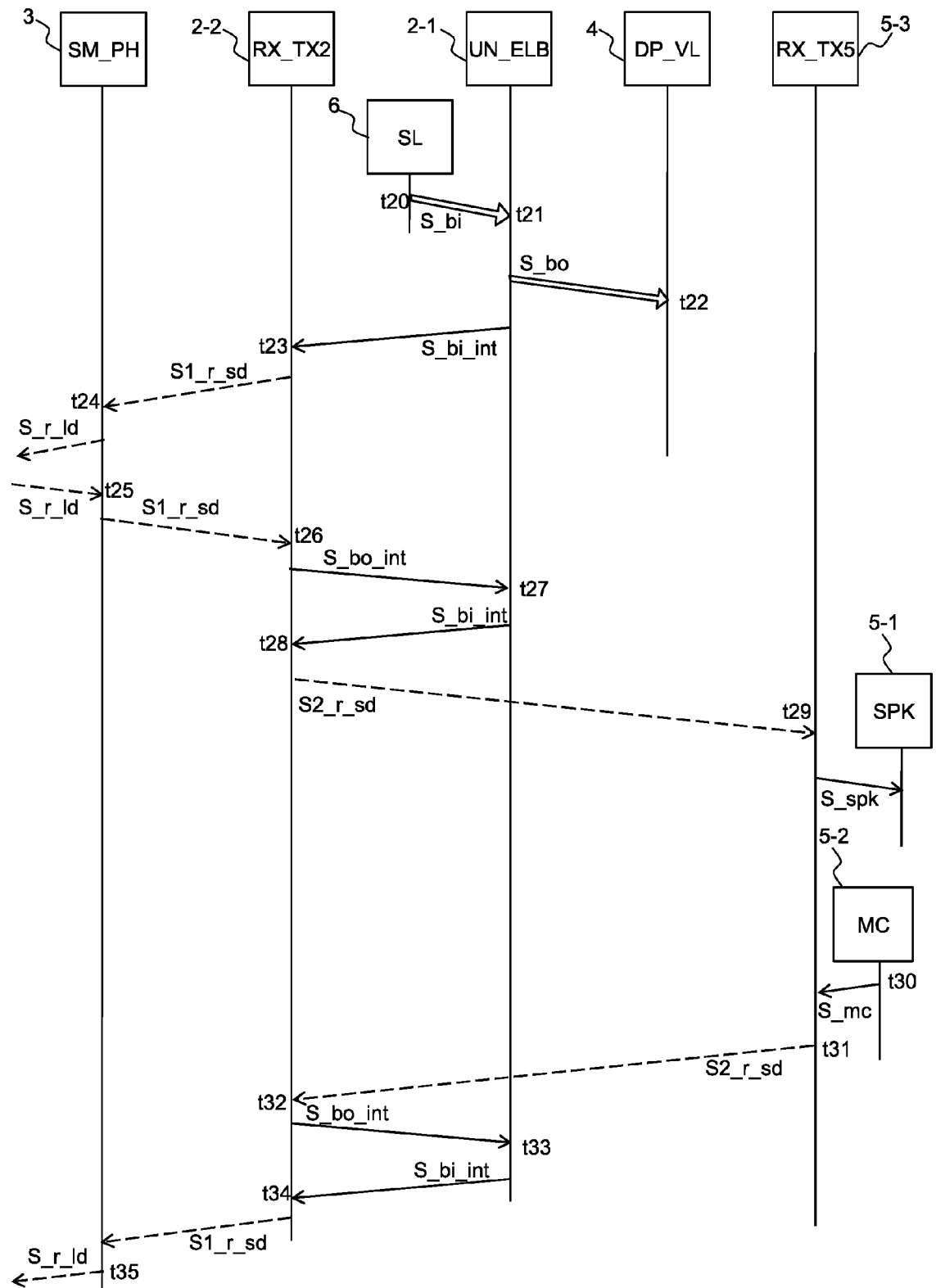
FIG. 4 schematically shows a communication protocol between the electronic devices according to the disclosure in the case of an outgoing voice call.

With reference to FIG. 4, it shows the timing sequence of the signals and messages of the communication protocol between the devices of the electronic system 1, in the event that the motorcyclist activates the procedure for making an outgoing voice call by typing in a phone number.

It is possible to observe that also in this case there is a voice call configuration phase comprised between t20 and t24.

Moreover, it is possible to observe that there is a subsequent phase wherein the phone conversation is actually carried out comprised between t25 and t35, wherein the audio data of the phone conversation are transmitted by the smartphone 3 to the speaker 5-1 by means of the routing electronic device 2 and the audio data of the phone conversation are transmitted by the microphone 5-2 to the smartphone 3 by means of the routing electronic device 2.

In this case as well it is possible to observe that there is always an exchange of information between the short-range radio receiver/transmitter 2-2 and the processing unit 2-1, as shown between times t26 and t28 and between times t32 and t34.

Figure 5:
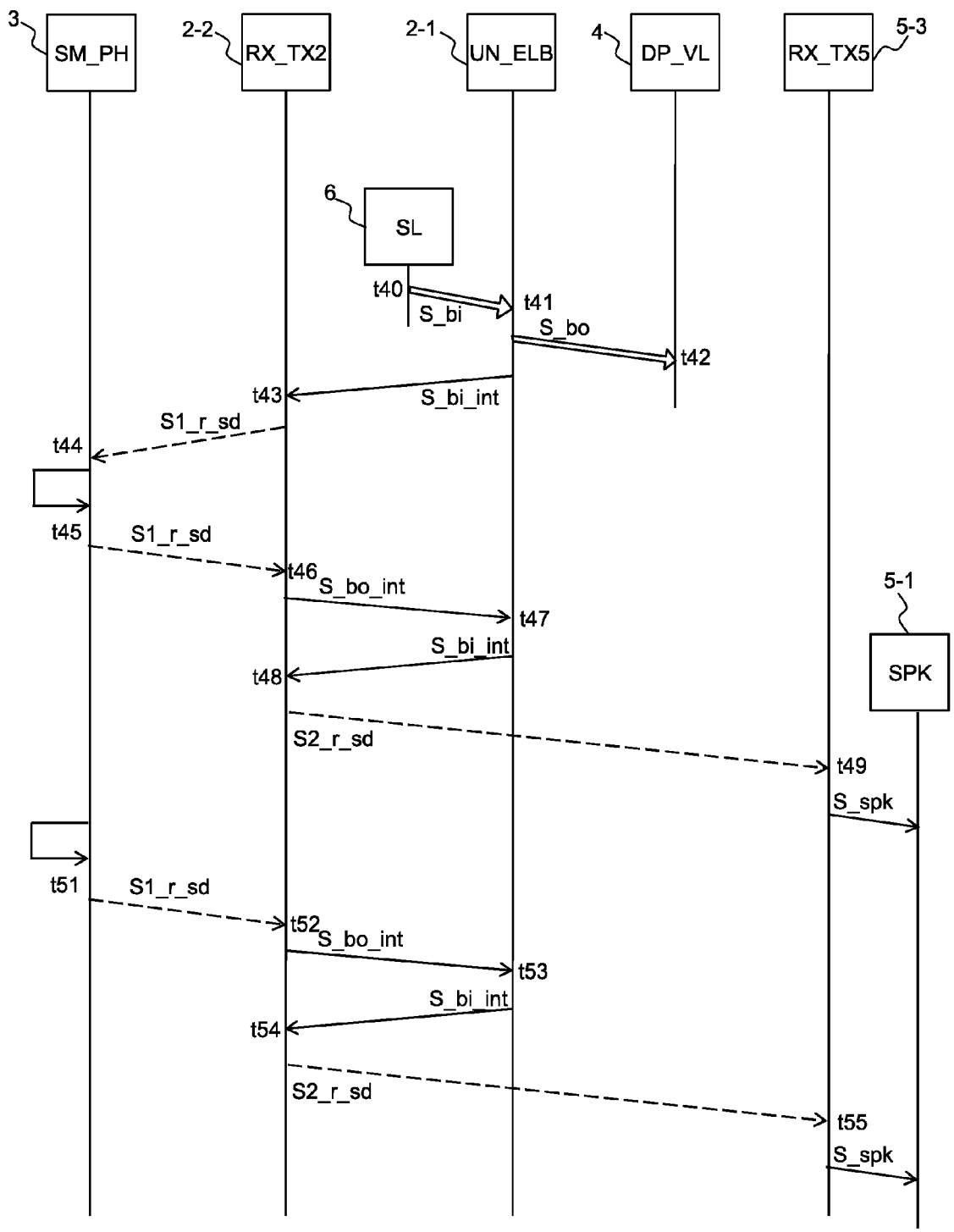
FIG. 5 schematically shows a communication protocol between the electronic devices according to the disclosure in the case of playing a music track.

With reference to FIG. 5, it shows the timing sequence of the signals and messages of the communication protocol between the devices of the electronic system 1, in the event that the motorcyclist activates the play of a music track.

It is possible to observe that at times t45 and t51 two portions of the music track are read by a memory which is inside the smartphone 3 and that such portions are transmitted by the smartphone 3 to the speaker 5-1 by means of the routing electronic device 2.

In this case as well it is possible to observe that there is always an exchange of information between the short-range radio receiver/transmitter 2-2 and the processing unit 2-1, as shown between times t46 and t48 and between times t52 and t54.

It will be described hereinafter the operation of the electronic system 1 in the case of an incoming voice call of a phone conversation between a motorcyclist riding a motorcycle and another person who has a smartphone, making also reference to FIGS. 1, 2 and 3.

For the sake of simplicity we shall consider a motorcycling application, wherein the electronic system 1 is mounted on a motorcycle, the mobile electronic device 3 is a smartphone of the motorcyclist, the audio player device 5 is a headset installed inside a protective helmet worn by the motorcyclist and the selector 6 is mounted on the motorcycle handlebars.

In this case the selector 6 is a switch cube implemented as shown in FIG. 6 and it is mounted on the motorcycle handlebar; moreover the screen 4 is positioned in the motorcycle dashboard so as to be easily visible to a motorcyclist while he is riding.

Moreover, let us consider the case wherein the selector 6 is connected to the routing electronic device 2 by means of the communication bus 9. In this case the selector 6 further comprises a generation circuit configured to generate a message that is compliant with the protocol of the communication bus 9.

The smartphone 3 is positioned for example inside a pocket of the motorcyclist's jacket or inside the trunk of the motorcycle.

At the initial time t0 the smartphone 3 receives from a radio-mobile network a long-range radio signal S_r_ld carrying data indicating an incoming voice call request and the caller's phone number and it starts the configuration phase of the incoming voice call.

The long-range radio receiver/transmitter of the smartphone 3 receives the received long-range radio signal S_r_ld, extracts the data indicating the incoming voice call request and caller's phone number, then the short-range radio transmitter of the smartphone 3 transmits the first short-range radio signal S1_r_sd carrying the data indicating the incoming voice call request and the caller's phone number.

At time t1 (subsequent to t0) the short-range radio receiver/transmitter 2-2 of the routing electronic device 2 receives the first short-range radio signal S1_r_sd, extracts the data indicating the incoming voice call request and the caller's phone number and transmits to the processing unit 2-1 of the routing electronic device 2 the internal output signal S_bo_int carrying a message indicating the incoming voice call request and the caller's phone number.

At time t2 (subsequent to t1) the processing unit 2-1 receives the internal output signal S_bo_int, extracts the content of the message and transmits over the communication bus 9 the bus output signal S_bo carrying a message indicating the incoming voice call request and the caller's phone number.

At time t3 (subsequent to t2) the screen 4 reads from the communication bus 9 the bus output signal S_bo carrying the message indicating the incoming voice call request and the caller's phone number, and on the screen 4 a graphic or text indication is displayed which indicates that an incoming voice call request is active and/or the caller's phone number is displayed.

At time t4 (subsequent to t3) the motorcyclist presses a button of the switch cube 6 (for example, he presses the button 20-1) and he accepts the incoming voice call, then the generation circuit inside the switch cube 6 transmits over the communication bus 9 the bus input signal S_bi carrying a message indicating an accepted incoming voice call.

At time t5 (subsequent to t4) the processing unit 2-1 reads the bus input signal S_bi carrying the message indicating the accepted incoming voice call and generates the internal input signal S_bi_int carrying the message indicating the accepted incoming voice call.

At time t6 (subsequent to t5) the short-range radio receiver-transmitter 2-2 inside the routing electronic device 2 receives the internal input signal S_bi_int, extracts the message indicating the accepted incoming voice call and transmits the first short-range radio signal S1_r_sd carrying data indicating the accepted incoming voice call.

At time t7 (subsequent to t6) the short-range radio receiver-transmitter of the smartphone 3 receives the first short-range radio signal S1_r_sd and extracts the data indicating the accepted incoming voice call.

Therefore at time t7 the smartphone 3 detects that it had previously sent (time t0) the incoming voice call request, detects that is has received the indication that the incoming voice call has been accepted, activates the circuits of the smartphone 3 necessary to set up a bidirectional voice communication between the smartphone 3 and the radio-mobile network and between the smartphone 3 and the headset 5 (via the routing electronic device 2), thus the long-range radio receiver-transmitter of the smartphone 3 transmits towards the radio-mobile network the long-range radio signal S_r_ld carrying data indicating the accepted incoming voice call.

At time t8 (subsequent to t7) the smartphone 3 receives from the radio-mobile network the long-range radio signal S_r_ld carrying the audio data representive of the voice of the person with whom the voice communication has been set up and the actual phone conversation phase begins.

The long-range radio receiver/transmitter of the smartphone 3 receives the received long-range radio signal S_r_ld, extracts the audio data of the voice communication, then the short-range radio receiver/transmitter of the smartphone 3 transmits the first short-range radio signal S1_r_sd carrying the audio data of the voice communication.

At time t9 (subsequent to t8) the short-range radio receiver/transmitter 2-2 of the routing electronic device 2 receives the first short-range radio signal S1_r_sd, extracts the audio data of the voice communication and transmits to the processing unit 2-1 the internal output signal S_bo_int carrying a message including the audio data of the voice communication.

At time t10 (subsequent to t9) the processing unit 2-1 receives the internal output signal S_bo_int, extracts the content of the message and transmits the internal input signal S_bi_int carrying a message including the audio data of the voice communication.

At time t11 (subsequent to t10) the short-range radio receiver-transmitter 2-2 inside the routing electronic device 2 receives the internal input signal S_bi_int, extracts the message including the audio data of the voice communication and transmits the second short-range radio signal S2_r_sd carrying the audio data of the voice communication.

At time t12 (subsequent to t11) the short-range radio receiver-transmitter 5-3 of the headset 5 receives the second short-range radio signal S2_r_sd, extracts the audio data of the voice communication and generates the driving signal S_spk driving the speaker 5-1 positioned inside the protective helmet worn by the motorcyclist, thus generating a sound signal reproducing the voice of the other person with whom he has set up the telephone voice communication.

Therefore at time t12 the motorcyclist has heard the voice of the other person with whom he has set up the telephone voice communication.

At time t13 (subsequent to t12) the motorcyclist speaks and generates a sound signal, which is acquired by the microphone 5-2 positioned inside the protective helmet and a voice signal S_mc representative of the motorcyclist's voice is generated.

At time t14 (subsequent to t13) the short-range radio receiver-transmitter 5-3 inside the headset 5 receives the voice signal S_mc and generates, as a function thereof, the second short-range radio signal S2_r_sd carrying the audio data representive of the motorcyclist's voice.

At time t15 (subsequent to t14) the short-range radio receiver-transmitter 2-2 of the routing electronic device 2 receives the second short-range radio signal S2_r_sd, extracts the audio data representive of the motorcyclist's voice and transmits to the processing unit 2-1 the internal output signal S_bo_int carrying the audio data representive of the motorcyclist's voice.

At time t16 (subsequent to t15) the processing unit 2-1 receives the internal output signal S_bo_int, extracts the content of the message and transmits the internal input signal S_bi_int carrying a message including the audio data representive of the motorcyclist's voice.

At time t17 (subsequent to t16) the short-range radio receiver-transmitter 2-2 inside the routing electronic device 2 receives the internal input signal S_bi_int, extracts the message including the audio data representive of the motorcyclist's voice and transmits the second short-range radio signal S2_r_sd carrying the audio data representive of the motorcyclist's voice.

At time t18 (subsequent to t17) the short-range radio receiver-transmitter of the smartphone 3 receives the second short-range radio signal S2_r_sd, extracts the data representive of the motorcyclist's voice, then the long-range radio receiver-transmitter of the smartphone 3 transmits towards the radio-mobile network the long-range radio signal S_r_ld carrying the audio data representive of the motorcyclist's voice.

It will be described hereinafter the operation of the electronic system 1 in the case of an outgoing voice call made by typing in a phone number, making also reference to FIGS. 1, 2 and 4.

The operation of the electronic system 1 according to the communication protocol shown in FIG. 4 differs from the one of FIG. 3 in that it is not present the incoming voice call request phase comprised between times t0 and t3.

In particular, at time t20 the motorcyclist presses a button of the switch cube 6 (for example, he presses the button 20-1) and activates the outgoing voice call request, types in a phone number to be called by pressing several times one or more buttons of the switch cube 6 (for example, buttons 20-2, 20-3), then the generation circuit inside the switch cube 6 transmits over the communication bus 9 the bus input signal S_bi carrying a message indicating the outgoing voice call request and the typed phone number.

At time t21 (subsequent to t20) the processing unit 2-1 reads the bus input signal S_bi carrying the message indicating the outgoing voice call request and the called phone number, extracts the content of the message and transmits over the communication bus 9 the bus output signal S_bo carrying a message indicating the outgoing voice call request and the phone number called.

Moreover, the processing unit 2-1 generates the internal input signal S_bi_int carrying the message indicating the outgoing voice call request and the called phone number.

At time t22 (subsequent to t21) the screen 4 reads from the communication bus 9 the bus output signal S_bo carrying the message indicating the outgoing voice call request and the called phone number, then a graphic or text indication is displayed on the screen 4 indicating that the outgoing voice call has been requested and/or the phone number called is displayed.

At time t23 (subsequent to t22) the short-range radio receiver/transmitter 2-2 inside the routing electronic device 2 receives the internal input signal S_bi_int, extracts the message indicating the outgoing voice call request and the phone number called and transmits the first short-range radio signal S1_r_sd carrying data indicating the outgoing voice call request and the phone number called.

At time t24 (subsequent to t23) the short-range radio receiver/transmitter of the smartphone 3 receives the first short-range radio signal S1_r_sd, extracts the data indicating the outgoing voice call request and the phone number called, then the long-range radio receiver/transmitter of the smartphone 3 transmits towards the radio-mobile network the long-range radio signal S_r_ld carrying the data indicating the outgoing voice call request and the phone number called.

The operation between times t25 and t32 is similat to the previously described operation between times t8 and t18 of FIG. 3; therefore, bidirectional voice communication is set up between the motorcyclist riding the motorcycle and another person.

According to a variant of FIG. 4, the called phone number is selected from a telephone book stored into a memory inside the smartphone 3.

In this case the communication protocol shown in FIG. 4 is modified in such a way that between times t20 and t21 further messages are exchanged to allow to display the list of phone numbers on the screen 4 and to allow to select (by pressing one or more times the buttons 20-1, 20-2, 20-3 of the switch cube 6) a number from said list of phone numbers. For example, by pressing the buttons 20-2, 20-3 it is possible to scroll up or down through the list of phone numbers, while the phone number can be selected by pressing the button 20-1. The selected phone number is then called, analogously to what explained previously between times t23 and t35.

It will be described hereinafter the operation of the electronic system 1 in the case of playing a music track, also making reference to FIGS. 1, 2 and 5.

The operation of the electronic system 1 according to the communication protocol shown in FIG. 5 differs from the one of FIG. 3 in that it is not present the phase comprised between times t0 and t3 relating to the incoming voice call request phase, in that it is not present the phase comprised between times t13 and t18 relating to transmission of the sound signal generated by the microphone 5-2 and in that the music track is read by a memory inside the smartphone 3.

For the sake of simplicity, it shall be assumed that only one music track is stored into the memory inside the smartphone.

In particular, at time t40 the motorcyclist presses one button of the switch cube 6 (for example, prolonged pressing of the button 20-1) and activates the selection of a music track, then the generation circuit inside the switch cube 6 transmits over the communication bus 9 the bus input signal S_bi carrying a message indicating a request to play a music track and the title of the music track (and possibly of the artist).

At time t41 (subsequent to t40) the processing unit 2-1 reads the bus input signal S_bi carrying the message indicating the request to play a music track and the title of the music track (and possibly of the artist), extracts the content of the message and transmits over the communication bus 9 the bus output signal S_bo carrying a message indicating the request to play a music track and the title of the music track (and possibly of the artist).

Moreover, the processing unit 2-1 generates the internal input signal S_bi_int carrying the message indicating the request to play a music track and the title of the music track (and possibly of the artist).

At time t42 (subsequent to t41) the screen 4 reads from the communication bus 9 the bus output signal S_bo carrying the message indicating the request to play a music track and the title of the music track (and possibly of the artist) and a graphic or text indication is displayed on the screen 4 indicating that a request has been made to play a music track and/or the title of the music track (and possibly of the artist) is displayed.

At time t43 (subsequent to t42) the short-range radio receiver-transmitter 2-2 inside the routing electronic device 2 receives the internal input signal S_bi_int, extracts the message indicating the request to play a music track and the title of the music track (and possibly of the artist) and transmits the first short-range radio signal S1_r_sd carrying data indicating the request to play a music track and the title of the music track (and possibly of the artist).

At time t44 (subsequent to t43) the short-range radio receiver-transmitter of the smartphone 3 receives the first short-range radio signal S1_r_sd and extracts the data indicating the request to play a music track and the title of the music track (and possibly of the artist).

At time t45 (subsequent to t44) the smartphone 3 reads a first portion of the music track from its memory and transmits (by means of its short-range radio transmitter) the first short-range radio signal S1_r_sd carrying the audio data of the first portion of the music track.

At time t46 (subsequent to t45) the short-range radio receiver-transmitter 2-2 of the routing electronic device 2 receives the first short-range radio signal S1_r_sd, extracts the audio data of the first portion of the music track and transmits to the processing unit 2-1 the internal output signal S_bo_int carrying a message including the audio data of the first portion of the music track.

At time t47 (following t46) the processing unit 2-1 receives the internal output signal S_bo_int, extracts the content of the message and transmits the internal input signal S_bi_int carrying a message including the audio data of the first portion of the music track.

At time t48 (subsequent to t47) the short-range radio receiver-transmitter 2-2 inside the routing electronic device 2 receives the internal input signal S_bi_int, extracts the message including the audio data of the first portion of the music track and transmits the second short-range radio signal S2_r_sd carrying the audio data of the first portion of the music track.

At time t49 (subsequent to t48) the short-range radio receiver-transmitter 5-3 of the headset 5 receives the second short-range radio signal S2_r_sd, extracts the audio data of the first portion of the music track and generates the driving signal S_spk driving the speaker 5-1 positioned inside the protective helmet worn by the motorcyclist, thus generating a sound signal which plays the first portion of the music track.

Therefore at time t49 the motorcyclist has listened to the first portion of the music track.

The operation between times t51 and t55 is similar to the previously described operation between times t45 and t49, with the difference that a second portion of the music track is transmitted.

Therefore at time t55 the motorcyclist has listened to the second portion of the music track.

For the sake of simplicity, FIG. 5 shows the transmission of two portions of the music track, but more than two portions can be present, i.e. all the portions composing the music track are transmitted.

It should be observed that FIG. 5 shows that time t51 wherein the second portion of the music track is read and transmitted is subsequent to time t49 wherein the first portion is received, but time t51 can also be before time t49, that is the transmission of the second portion can also begin before the first portion has been received by the audio player device 5.

According to a variant of the communication protocol of FIG. 5, the memory inside the smartphone 3 stores a plurality of music tracks and thus the motorcyclist can select and play any one of the plurality of music tracks in the list.

In this case the communication protocol of FIG. 5 is modified in such a way that between times t44 and t46 further messages are exchanged in order to allow to display the list of music tracks on the screen 4 and to allow to scroll through (by repeatedly pressing the buttons 20-2, 20-3 of the switch cube 6) a list of music tracks and select (by pressing the button 20-1) a music track from said list. The music track selected from the list is then transmitted by the smartphone 3 to the speaker 5-1, analogously to what was previously explained between times t45 and t55.

In one embodiment, according to a variant of the disclosure, the electronic system 1 further comprises an navigation electronic device 7, for example of the GPS type.

In this case the audio player device 5 is such to exchange short-range radio signals with the navigation electronic device 7 by means of the routing electronic device 2.

The electronic navigation device 7 comprises a short-range radio signal receiver-transmitter configured to receive/transmit from/to the routing electronic device a third short-range radio signal S3_r_sd carrying the audio data of the voice directions indicating the route to be followed in order to reach the destination.

Moreover, the short-range radio receiver-transmitter 5-3 of the audio player device is further configured to receive the second short-range radio signal S2_r_sd carrying the audio data representive of road directions for reaching a destination.

The short-range radio signals are for example of the Bluetooth or WiFi type.

According to said variant, the selector 6 is further configured to select one of the following navigation functionalities:
  activating the configuration of a destination;
  activating navigation towards a previously configured destination;
  stopping navigation towards the currently configured destination;
  changing the currently configured destination;
  changing the navigation options, such as, for example, the type of route (faster or shorter), the type of usable roads (highways and state roads, or only state roads).

Alternatively, the selector 6 is further configured to activate a fourth operating mode indicating "navigation towards a destination".

In the event that the fourth operating mode is active, the selector 6 is further configured to select one of the following functions:
  activating the configuration of a destination;
  activating navigation towards a previously configured destination;
  stopping navigation towards the currently configured destination;
  changing the currently configured destination;
  changing the navigation options, such as, for example, the type of route (faster or shorter), the type of usable roads (highways and state roads, or only state roads).

Moreover, the short-range radio receiver-transmitter 2-2 of the routing electronic device 2 is further configured to receive/transmit the third short-range radio signal S3_r_sd from/to the electronic navigation device 7.

Moreover, the image display device 4 is further configured to display information in text form and/or images representive of the further navigation functionalities, in particular:
  if the functionality is to configure a destination, the image display device 4 is configured to display a keyboard representive of alphanumeric characters and a line including the selected characters indicating the configured destination;
  if the functionality is to activate the navigation, the image display device 4 is configured to display an icon representive of the start of navigation;
  if the functionality is to stop the navigation, the image display device 4 is configured to display an icon representive of the stopping of navigation.

The previous considerations concerning the operation of the disclosure with reference to the smartphone 3 are applicable in an analogous manner to the electronic navigation device 7.

In particular, the electronic system 1 according to said variant of the disclosure allows the motorcyclist to listen, through the speaker 5-1 installed inside the protective helmet, to the voice directions generated by the electronic navigation device 7 indicating the route to be followed to reach the destination (for example, "turn right", "turn left", "go straight").

Moreover, the electronic system 1 according to said variant of the disclosure allows the motorcyclist, by means of the selector 6 mounted on the handlebar and/or by means of the microphone 5-2 installed inside the protective helmet, to configure a destination, to activate the navigation towards the previously configured destination, to stop navigation towards the actually configured destination, to change the actually configured destination, to change the navigation options.

According to a fourth aspect, the present disclosure relates to a method for short-range radio connecting a plurality of electronic devices. The method comprises the following steps:

a) receiving from a radio-mobile network a long-range radio signal S_r_ld carrying data indicating an incoming voice call request and a caller's phone number and transmitting a first short-range radio signal S1_r_sd carrying the data indicating the incoming voice call request and the caller's phone number;

b) receiving the first short-range radio signal S1_r_sd, extracting the data indicating the incoming voice call request and the caller's phone number and transmitting a signal S_bo_int carrying a first message indicating the incoming voice call request and the caller's phone number;

c) receiving the signal S_bo_int carrying the first message indicating the incoming voice call request and the caller's phone number, extracting the content of the first message and transmitting a third message indicating the caller's phone number;

d) displaying the caller's phone number;

e) generating a fourth message indicating the accepted incoming voice call;

f) receiving the fourth message and transmitting a signal S_bi_int carrying a second message indicating the accepted incoming voice call;

g) receiving the signal S_bi_int carrying the second message, extracting the content of the second message and transmitting the first short-range radio signal S1_r_sd carrying data indicating the accepted incoming voice call;

h) receiving the first short-range radio signal S1_r_sd and transmitting the long-range radio signal carrying data indicating the accepted incoming voice call;

i) receiving the long-range radio signal carrying the audio data of a voice communication and transmitting the first short-range radio signal S1_r_sd carrying the audio data of the voice communication;

j) transmitting the second short-range radio signal S2_r_sd carrying said audio data of the voice communication;

k) receiving the second short-range radio signal carrying said audio data of the voice communication and generating a sound signal representive of the audio data of the voice communication;

l) acquiring a sound signal of the voice communication and generating a voice signal S_mc representative of the acquired sound signal;

m) transmitting the second short-range radio signal S2_r_sd carrying the audio data representive of the acquired sound signal;

n) transmitting the first short-range radio signal S1_r_sd carrying the audio data representive of the acquired sound signal of the voice communication.

In a first embodiment of the fourth aspect, the method further comprises, between steps i)-j), the steps of:

i1) receiving the first short-range radio signal S1_r_sd carrying audio data of the voice communication and transmitting the signal S_bo_int carrying the first message including the audio data of the voice communication;

i2) receiving the signal S_bo_int carrying the first message including the audio data of the voice communication and transmitting the signal S_bi_int carrying the second message including the audio data of the voice communication;

i3) receiving the signal S_bi_int carrying the second message including the audio data of the voice communication and transmitting the second short-range radio signal S2_r_sd carrying said audio data of the voice communication.

In a second embodiment of the fourth aspect, instead of steps a)-e), the method comprises the steps of:

a1) generating the fourth message S_bi indicating an outgoing voice call request and a called phone number;

a2) transmitting the third message S_bo indicating the called phone number;

a3) displaying the called phone number;

and wherein in steps f)-h) the data indicate the outgoing voice call.

In a third embodiment of the fourth aspect, in step a1) the fourth message indicates a request to play a music track and a title of the music track, in step a2) the third message indicates the title of the music track, and in step a3) the title of the music track is displayed; moreover, in steps f)-h) the data indicate a request to play the music track and the title of the music track and in steps i)-n) the audio data represent at least a portion of the music track.

According to a fifth aspect, the present disclosure relates to a computer readable medium having a program recorded thereon, said computer readable medium comprising computer program code means adapted to perform part of the steps of the method according to the fourth aspect when said program is run on a computer, in particular the following steps:

steps c), f) of the method according to the fourth aspect;
steps c), f), i2) of the method according to the first embodiment of the fourth aspect;
steps a2), f) of the method according to the second or third embodiment of the fourth aspect.

The invention claimed is:

1. An electronic device for routing short-range radio signals, the device comprising:

a receiver/transmitter of short-range radio signals configured to:

receive, from a mobile electronic device, a first short-range radio signal that includes data indicating an incoming voice call request and a caller's phone number and transmit a signal that includes a first message indicating the incoming voice call request and the caller's phone number;

receive a second signal that includes a second message indicating that the incoming voice call has been accepted and transmit the first short-range radio signal that includes data indicating the incoming voice call has been accepted to the mobile electronic device;

receive the first short-range radio signal that includes audio data of a voice communication from the mobile electronic device and transmit the signal carrying the first message including the audio data of the voice communication;

receive the signal carrying the second message including the audio data of the voice communication and transmit a second short-range radio signal that includes said audio data of the voice communication to an audio player device;

a processing unit bidirectionally connected to the receiver/transmitter of short-range radio signals, the processing unit being configured to:

receive the signal that includes the first message indicating the incoming voice call request and the caller's phone number and transmit a third message indicating the caller's phone number to an image display device;

receive a fourth message indicating the accepted incoming voice call from a selector and transmit the signal that includes the second message indicating the accepted incoming voice call;

receive the signal carrying the first message that includes the audio data of the voice communication and transmit the signal carrying the second message that includes the audio data of the voice communication.

2. The electronic device according to claim 1, wherein the receiver/transmitter is further configured to:

receive the second short-range radio signal that includes the audio data representative of a sound signal of the voice communication acquired from a microphone;

transmit the first short-range radio signal carrying the audio data representative of the acquired sound signal of the voice communication to the mobile electronic device.

3. The electronic device according to claim 2, wherein the receiver/transmitter is further configured to:

receive the first short-range radio signal carrying audio data of the voice communication from the mobile electronic device and transmit the signal carrying the first message including the audio data of the voice communication;

receive the signal carrying the second message including the audio data of the voice communication and transmit the second short-range radio signal carrying said audio data of the voice communication to the audio player device;

wherein the processing unit is further configured to receive the signal carrying the first message including the audio data of the voice communication and transmit the signal carrying the second message including the audio data of the voice communication.

4. The electronic device according to claim 1, wherein the processing unit is further configured to:

receive the fourth message indicating a request of an outgoing voice call from the selector and transmit the third message indicating a called phone number to the image display device;

transmit the signal carrying the second message indicating the outgoing voice call request and the called phone number to the receiver/transmitter;

and wherein the short-range radio signal receiver/transmitter is further configured to:

receive the signal carrying the second message indicating the outgoing voice call request and the called phone number and transmit the first short-range radio signal carrying data indicating the outgoing voice call request and the called phone number to the mobile electronic device;

receive the first short-range radio signal carrying the audio data of the voice communication from the mobile electronic device;

transmit the second short-range radio signal carrying said audio data of the voice communication to the audio player device;

receive the second short-range radio signal carrying the audio data representative of a sound signal of the voice communication acquired by the microphone;

transmit the first short-range radio signal carrying the audio data representative of the acquired sound signal of the voice communication to the mobile electronic device.

5. The electronic device according to claim 1, wherein the processing unit is further configured to:

receive the fourth message indicating a request to play a music track from the selector and transmit the third message indicating a title of the music track to the image display device;

transmit the signal carrying the second message indicating the request to play the music track and the title of the music track;

and wherein the receiver/transmitter is further configured to:

receive a signal carrying the second message indicating the request to play the music track and the title of the music track and the first short-range radio signal carrying data indicating the request to play the music track and the title of the music track transmit towards the mobile electronic device;

receive the first short-range radio signal carrying the audio data of at least a portion of the music track from the mobile electronic device;

transmit the second short-range radio signal carrying said audio data of the at least one portion of the music track towards the audio player device.

6. An electronic system for connecting a plurality of electronic devices with a short range radio connection, the electronic system comprising:

a routing electronic device according to claim 1;

a mobile electronic device configured to:

receive a long-range radio signal that includes data indicating the incoming voice call request and the caller's phone number from a radio-mobile network and transmit the first short-range radio signal that includes the data indicating the incoming voice call request and the caller's phone number to the routing electronic device;

receive the first short-range radio signal that includes the data indicating the accepted incoming voice call from the receiver/transmitter and transmit the long-range radio signal that includes data indicating the accepted incoming voice call to the radio-mobile network; and receive the long-range radio signal carrying the audio data of the voice communication from the radio-mobile network and transmit the first short-range radio signal that includes the audio data of the voice communication;

a selector configured to generate the fourth message indicating the accepted incoming voice call or indicating an outgoing voice call request or indicating the request to play a music track;

an image display device configured to display the caller's phone number or display the called phone number or display the title of the music track;

an audio player device comprising a speaker configured to generate a sound signal representative of the audio data of the voice communication.

7. The electronic system according to claim 6, wherein the audio player device further comprises a microphone configured to acquire the sound signal of the voice communication and generate a voice signal representative of the acquired sound signal.

8. The electronic system according to claim 6, wherein the mobile electronic device comprises a smartphone and the audio player device comprises a headset installed inside a protective helmet for motorcycles.

9. The electronic system according to claim 6, further comprising an electronic navigation device configured to exchange a third short-range radio signal with the routing electronic device.

10. A motorcycle comprising:

a routing electronic device according to claim 1;

a switch cube mounted on a motorcycle handlebar, the switch cube comprising a switch having a plurality of buttons configured to generate the fourth message indicating the accepted incoming voice call or indicating an outgoing voice call request or indicating the request to play the music track;

an image display device mounted in a dashboard of the motorcycle and configured to display the caller's phone number and/or display the called phone number and/or display the title of the music track.

11. Electronic device according to claim 1, wherein the short-range radio signals are of the Bluetooth type.

12. A method for connecting a plurality of electronic devices with short range radio, the method comprising:

a) receiving a long-range radio signal that include data indicating an incoming voice call request and a caller's phone number from a radio-mobile network and transmitting a first short-range radio signal that includes the data indicating the incoming voice call request and the caller's phone number;

b) receiving the first short-range radio signal, extracting the data indicating the incoming voice call request and the caller's phone number and transmitting a signal carrying a first message indicating the incoming voice call request and the caller's phone number;

c) receiving the signal that includes the first message indicating the incoming voice call request and the caller's phone number, extracting the content of the first message and transmitting a third message indicating the caller's phone number;

d) displaying the caller's phone number;

e) generating a fourth message indicating the accepted incoming voice call;

f) receiving the fourth message and transmitting a signal carrying a second message indicating the accepted incoming voice call;

g) receiving the signal that includes the second message, extracting the content of the second message and transmitting the first short-range radio signal that includes data indicating the accepted incoming voice call;

h) receiving the first short-range radio signal and transmitting the long-range radio signal that includes data indicating the accepted incoming voice call;

i) receiving the long-range radio signal that includes the audio data of a voice communication and transmitting the first short-range radio signal carrying the audio data of the voice communication;
  i1) receiving the first short-range radio signal carrying audio data of the voice communication and transmitting the signal that includes the first message including the audio data of the voice communication;
  i2) receiving the signal that includes the first message including the audio data of the voice communication and transmitting the signal that includes the second message including the audio data of the voice communication;
  i3) receiving the signal carrying the second message including the audio data of the voice communication and transmitting the second short-range radio signal that includes said audio data of the voice communication;
j) transmitting the second short-range radio signal carrying said audio data of the voice communication;
n) receiving the second short-range radio signal that includes said audio data of the voice communication and generating a sound signal representative of the audio data of the voice communication.

13. The method according to claim 12, comprising, instead of steps a)-e), the steps of:
  a1) generating the fourth message indicating an outgoing voice call request and a called phone number;
  a2) transmitting the third message indicating the called phone number;
  a3) displaying the called phone number;
  and wherein in the steps f)-h) the data indicate the outgoing voice call.

14. The method according to claim 13, wherein:
in step a1), the fourth message indicates a request to play a music track and a title of the music track;
in step a2), the third message indicates the title of the music track;
in step a3), the title of the music track is displayed;
in steps f)-h), the data indicate a request to play the music track and the title of the music track, and
in steps i)-n), the audio data represent at least one portion of the music track.

15. The method according to claim 12, further including the steps of:
  l) acquiring a sound signal of the voice communication and generating a voice signal representative of the acquired sound signal;
  m) transmitting the second short-range radio signal carrying the audio data representative of the acquired sound signal;
  n) transmitting the first short-range radio signal that includes the audio data representative of the acquired sound signal of the voice communication.

16. An electronic device for routing audio data between a mobile electronic device and an audio player device, the device comprising:
  a receiver/transmitter of short-range radio signals; and
  a processing unit bidirectionally connected with the receiver/transmitter,
  wherein the receiver/transmitter is configured to:
    receive, from a mobile electronic device, a first short-range radio signal that includes data indicating an incoming voice call request and a caller's phone number and transmit a signal that includes a first message indicating the incoming voice call request and the caller's phone number to the processing unit;
    receive a second signal that includes a second message indicating that the incoming voice call has been accepted from the processing unit and transmit the first short-range radio signal that includes data indicating the incoming voice call has been accepted to the mobile electronic device; and
    after the call has been accepted:
      receive the first short-range radio signal that includes audio data of a voice communication from the mobile electronic device and transmit the signal carrying the first message including the audio data of the voice communication to the processing unit, wherein the processing unit processes the audio data; and
      receive the signal carrying the second message including the audio data of the voice communication from the processing unit and transmit a second short-range radio signal that includes said audio data of the voice communication to the audio player device.

17. The device of claim 16, wherein the processing unit processes the audio data and causes the receiver/transmitter to transmit the audio data to multiple audio player devices.

18. The device of claim 16, wherein the processing unit is configured to:
  receive the signal that includes the first message indicating the incoming voice call request and the caller's phone number from the receiver/transmitter and transmit a third message indicating the caller's phone number to an image display device;
  receive a fourth message indicating that the incoming voice call has been accepted from a selector and transmit the signal that includes the second message indicating that the incoming voice call has been accepted to the receiver/transmitter; and
  receive the signal carrying the first message that includes the audio data of the voice communication from the receiver/transmitter and transmit the signal carrying the second message that includes the audio data of the voice communication to the receiver/transmitter.

* * * * *